United States Patent
Berg et al.

[11] Patent Number: 6,031,617
[45] Date of Patent: *Feb. 29, 2000

[54] SCANNING COLORIMETER WITH X-Y DRIVE

[75] Inventors: Bernard J. Berg, Kentwood; Douglas V. Baker, Middleville; David R. Bowden, Grandville; Thomas J. Boes; Lawrence D. Zandstra, both of Rockford, all of Mich.

[73] Assignee: X-Rite, Incorporated, Grandville, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/895,736

[22] Filed: Jul. 17, 1997

Related U.S. Application Data

[63] Continuation of application No. 08/435,029, May 4, 1995, which is a continuation-in-part of application No. 08/305,870, Sep. 14, 1994, abandoned.

[51] Int. Cl.[7] ........................................ G01J 3/46
[52] U.S. Cl. ............................................. 356/402
[58] Field of Search ........................... 356/402–411, 244, 356/238, 400, 147, 238.1–238.3, 418, 300, 416, 319; 250/559.01, 226, 548, 236; 364/526; 248/362; 702/40, 134–136; 382/112, 162–167

[56] References Cited

U.S. PATENT DOCUMENTS

| | | |
|---|---|---|
| 3,393,602 | 7/1968 | Stouffer . |
| 3,490,849 | 1/1970 | Hambleton . |
| 3,554,648 | 1/1971 | Boostrom et al. . |
| 4,003,660 | 1/1977 | Christie, Jr. et al. . |
| 4,029,420 | 6/1977 | Simms . |
| 4,082,464 | 4/1978 | Johnson, Jr. . |
| 4,093,991 | 6/1978 | Christie, Jr. et al. . |
| 4,131,367 | 12/1978 | French et al. . |
| 4,540,281 | 9/1985 | Akiyama . |
| 4,583,860 | 4/1986 | Butner . |
| 4,590,407 | 5/1986 | Bristol . |
| 4,644,172 | 2/1987 | Sandland et al. ............... 356/400 X |
| 4,692,603 | 9/1987 | Brass et al. ............... 250/236 |
| 4,825,078 | 4/1989 | Huber et al. . |
| 4,907,036 | 3/1990 | Morita . |
| 4,915,500 | 4/1990 | Selkowitz . |
| 4,930,865 | 6/1990 | Dosmann . |
| 4,968,143 | 11/1990 | Weston . |
| 4,995,727 | 2/1991 | Kawagoe . |
| 5,029,992 | 7/1991 | Richardson ............... 356/147 |
| 5,062,714 | 11/1991 | Peterson et al. . |
| 5,073,028 | 12/1991 | Bowden et al. ............... 356/402 |
| 5,189,495 | 2/1993 | Brunsting et al. . |
| 5,369,481 | 11/1994 | Berg et al. . |
| 5,372,783 | 12/1994 | Lackie . |
| 5,387,977 | 2/1995 | Berg et al. . |
| 5,519,210 | 5/1996 | Berner ............... 356/406 |

FOREIGN PATENT DOCUMENTS 0 444 689 A2  4/1991  European Pat. Off. .

*Primary Examiner*—K. P. Hantis
*Attorney, Agent, or Firm*—Warner Norcross & Judd LLP

[57] ABSTRACT

A colorimeter for reading color bars of printed sheets or the like includes a longitudinally extending base including a paper stop along which a sheet to be tested for color may be positioned. An autonomously operating colorimeter head is moved along the base in a direction parallel to the edge of the sheet by means of an electric motor mounted on the base and driving an helical thread lead screw engaging an X-axis carriage supporting the head. The head is moved by operation of the lead screw in a direction parallel to the edge of the sheet, referred to as the direction of the X-axis. The head includes an electric motor and a Y-axis transport supporting an optics unit. The optics unit is moved within the head in a direction parallel to a Y-axis, extending perpendicularly to the X-axis. The optics unit is preferably a spectrophotometer including a rotating wheel provided with a plurality of individual filters, spaced apart along the periphery of the wheel. The individual filters each pass light of a predefined wavelength onto a single photodetector and the signal derived from the photodetector is integrated over a period of time to provide an output signal representative of the intensity of a particular wavelength.

20 Claims, 11 Drawing Sheets

SCANNING COLORIMETER WITH X-Y DRIVE

This is a continuation of application Ser. No. 08/435,029 filed May 4,1995 which is a continuation-in-part of application Ser. No. 08/305,870 filed Sep. 14, 1994 now abandoned.

BACKGROUND OF THE INVENTION

1. Field of the Invention

The invention relates to color measurements and more particularly to a scanning colorimeter in which a movable head collects color information from an area along the path of travel of the head.

2. Background Art

Colorimeters, such as densitometers and spectrophotometers, are well known in the color measuring art. Densitometers are widely used, for example, as part of quality control of colors in the printing industry, to obtain measurements of color which are compared against a predetermined standard. Spectrophotometers are commonly used to identify colors for color matching purposes. It is common practice in the printing industry to provide color bars along one side of a sheet of paper. Scanning densitometers are commercially available which measure the various color bars and provide color information to a processing unit for further analysis. Typically, the scanning densitometers include a measuring head supported on a bridge or rails and moved along the color bars to measure color density. In typical prior art densitometers, the scanning heads are continuously in electrical communication with a stationary host computer so as to transmit parameter data and color measurement data between the scanning head and the computer system. The electrical cabling required for such communications can be of substantial weight. Several known densitometers require relatively heavy duty motors and control arrangements for moving the head. One of the difficulties in scanning densitometers is the accurate positioning of the head with its optics relative to the edges of the color bars. As the number of color bars is increased, the widths of the color bars and separation between adjacent color bars tend to be reduced and require a greater accuracy of positioning is required.

In the printing industry, it is often desirable to use two adjacent rows of color bars near one edge of a printed paper. Prior art scanning densitometers require that the paper be separately positioned with respect to the densitometer for each of the rows of color bars. It is, therefore, desirable to provide a scanning densitometer capable of reading color bars of adjacent rows without a repositioning of the paper.

A scanning densitometer preferably includes a paper stop such that a sheet may be conveniently placed against the stop without concern for special alignment of a row of color bars with respect to the path of travel of the densitometer head. However, in some applications, the color bar is immediately adjacent the edge of the paper and when the paper with the color bar immediately adjacent the edge is placed against the paper stop, the paper stop may interfere with the optical head, thereby preventing proper color measurements. Hence, other measures must be taken to assure proper positioning of the color bars relative to the path of the head.

Principles of densitometry are well known. A prior art densitometer typically includes a light source which projects light onto the object sampled to be measured in a direction which is normal to the plane of the object sampled. Light reflected from the object sampled is detected by means of three separate filters, each disposed at an angle of 45° from normal. The three separate filters are employed for purposes of discriminating the read, green, and blue spectral responses sensors associated with each of the filters detect white rays emanating through the corresponding filters and provide and electrical output signal proportional to the intensity of the detected light rays. Electrical signals generated by the detectors are supplied to signal processing circuitry which computes data representative of the color measurements.

A prior art scanning densitometer is disclosed in U.S. Pat. No. 5,073,028, issued Dec. 17, 1991. That scanning densitometer includes an autonomous densitometer head including a motor propelling the densitometer head along transport bars which may be raised and lowered to insert a sample sheet under the transport bars. The prior art densitometer includes a docking end provided with an optical coupler and electrical coupler. A corresponding optical coupler and electrical coupler are provided in the autonomously moving head. Densitometer measurements are obtained by the head as it travels over color bars or the like to be measured, storing color information in a memory internal to the head. When the measurement is completed, the unit returns to the docking end and transfers data via the optical coupler and connectors on the docking end to a host computer. While at the docking end, electrical connection is made to the head to charge an internal battery which drives the internal motor as well as information processing and storing circuitry. A disadvantage of that system, however, is that the transport arrangement is relatively expensive and accurate alignment of color bars and the like with the path of travel of the head is required.

A disadvantage of prior scanning densitometers is that the densitometer head tends to be relatively bulky and heavy and it is often difficult to rapidly move the head and obtain accurate positioning. A further disadvantage of densitometers is that a limited amount of information regarding the reflected light is obtained by the standard three filters and associated detectors of a standard densitometer.

SUMMARY OF THE INVENTION

These and other problems of the prior art all overcome in accordance with the principles of this invention by means of a movable colorimeter head which includes a movable optics unit for taking optical measurements. In accordance with one aspect of the invention, the head is moved in the direction of an X-axis extending parallel to one edge of the paper or material to be measured and the optical unit performing the color measurements is movable in the direction of a Y-axis, extending perpendicular to the X-axis. Advantageously, the movement of the optical unit in the direction allows for proper alignment with color bars of various dimensions and disposed at varying distances from an edge of a sheet of paper. Additionally, the colorimeter head of this invention is capable of reading patches of parallel rows of color patches by movement of the optics in the direction of the Y-axis.

In one embodiment of the invention, the head includes a processor and a memory which stores data obtained from a plurality of readings. After all readings from a sheet have been obtained, the head is returned to a docking end and the data is transmitted via a communication interface from the head to an interconnection to a host computer.

In accordance with one aspect of the invention, the densitometer head is mounted on an X-axis transport which is moved in the direction of the X-axis by rotation of a helical thread lead screw driven by a stationary motor at one end of the colorimeter unit. In accordance with a particular aspect of the invention, the X-axis transport is supported in an extruded base which includes a vacuum chamber having an upper surface provided with a plurality of holes communicating with the vacuum chamber. A vacuum connection is applied to the internal chamber and a sheet of paper is retained in position on the platform by means of the vacuum.

In one embodiment of the invention, the extruded base comprises a further longitudinally extending transport chamber including a slotted opening and horizontally extending grooves in opposing walls of the chamber. The X-axis transport comprises a support structure provided with horizontally disposed wheels engaging the grooves in the opposing side walls. The X-axis transport further comprises a platform which is structurally connected to the support structure via a neck piece extending through the slotted opening of the transport chamber and the densitometer head is supported on the platform. The X-axis transport may be provided with a centrally disposed threaded opening engaging the longitudinally extending helical thread lead screw.

In accordance with one aspect of the invention, a paper stop is mounted in the extruded base and comprises a plurality of independently retractable sections. The retractable sections are retracted as the head moves along its path of travel allowing the head to measure density of color strips disposed immediately adjacent the edge of the paper.

In accordance with one aspect of the invention, the scanning colorimeter is further enhanced to measure special ink characteristics by applying spectrophotometrics. In one embodiment of the invention, a spectrophotometer is used to obtain color measurements. Advantageously, the spectrophotometer includes a set of interference filters that separate light into narrow bands. This allows the reflected light to be sampled by a plurality of photo cells at a number of different wavelengths. In this manner, considerably more data relative to the reflected light is generated than in a typical densitometer and more accurate density measurements may be obtained. It is well known that there is a mathematical relationship between reflectivity, as measured by the spectrophotometer, and density. Specifically, density, D is defined as follows: $D=-\log_{10}R$, where R is reflectivity. Thus, the density measurements may be readily derived using signal processing circuitry or lookup tables, or the like.

In accordance with one aspect of the invention, a calorimeter comprises a rotating wheel spectrophotometer provided with a plurality of individual filters, spaced apart along the periphery of the wheel and driven by an electric motor. The individual filters each pass light of a predefined wavelength onto a single photodetector and the signal derived from the photodetector is integrated over a period of time to provide an output signal representative of the intensity at the particular wavelength passed by the filter.

In accordance with another aspect of the invention, the relative position of the filters with respect to the detector is determined by detecting the significant difference in intensity between light passed through the low wavelength filter (e.g. 400 nanometers) and the high end filter (e.g. 700 nanometers). Since the characteristic wavelength of each filter and the number of filters is known, it is easily determined by means of a signal processing device, such as a microprocessor, when a particular wavelength filter is in alignment with the detector.

In accordance with one particular aspect of the invention, an area to be measured is illuminated by a plurality of lamps arranged in a particular fashion to simultaneously illuminate the area. In one particular embodiment, a set of three illuminating lamps is used which are spaced apart by 120 degrees and disposed at a 45 degree angle to the area and the light receptor to cause light to be reflected from the specimen into the receptor. The three lamps are preferably each provided with a collimating lens to project collimated light onto the specimen in overlapping areas. Furthermore, a collimating tubular housing provided with a plurality of interior baffles is preferably used to direct the reflected light through the filters of the filter wheel and onto the detector. Advantageously, this arrangement provides a significant insensitivity to depth of field which allows for more accurate reading of color.

In accordance with one aspect of the invention, a light-conduction channel is provided between an illuminating lamp and a filter in the filter wheel to allow for accurate determination of the intensity of the supplied light received through the filters (as the filter wheel is rotated). In one particular embodiment invention, a lamp compensation circuit compensates for variations in the intensity of the light produced by plurality of lamps.

In accordance with another aspect of the invention, the individual filters providing monochromatic light at the various wavelengths are nonhygroscopic filters which do not require encapsulation and, therefore, can be more compactly mounted on the filter wheel. In one embodiment of the invention, the individual filters are rectangular in shape and each is retained within an individual retainer portion of the wheel. Advantageously, the rectangular-shaped filters are considerably cheaper to manufacture than the standard round filters and the individual retainers on the wheel simplify assembly and shipment of the filters and wheel and allow for individual replacement of a particular filter in the event that the filter is defective.

In accordance with another aspect of the invention, the light reflected from an object sample under test is filtered through a common blocking filter before the light reaches any of the filters in the filter wheel. The blocking capacitor preferably filters all light at wavelength outside of the 400 to 700 nanometers range. Advantageously, this arrangement allows for the use of less expensive filters is the filter wheel.

BRIEF DESCRIPTION OF THE DRAWINGS

The invention will now be described with reference to the drawings wherein.

DETAILED DESCRIPTION

Figure 1:
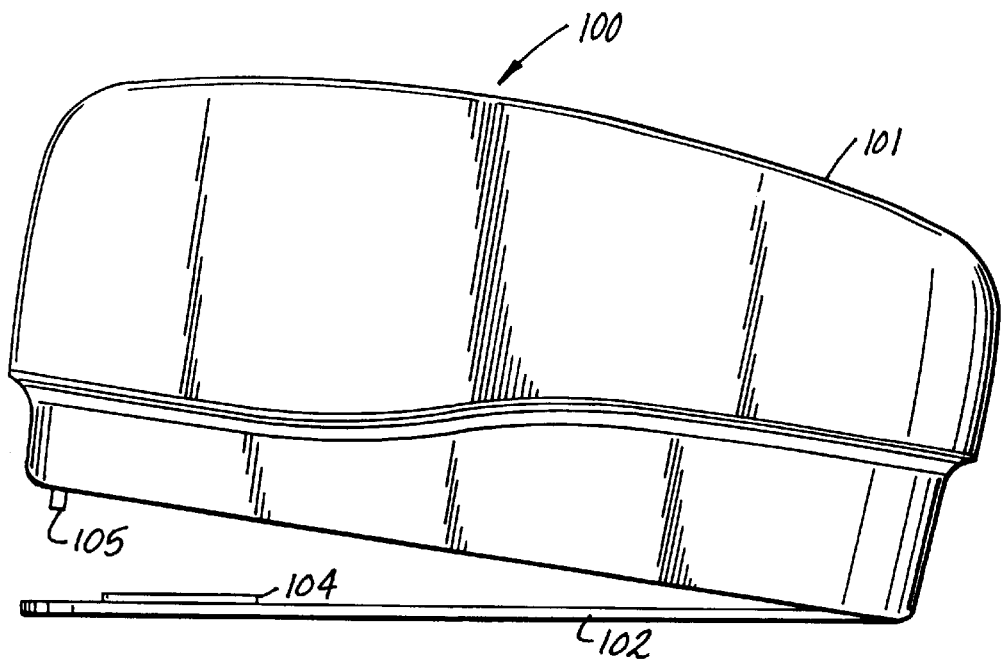
FIG. 1 is a perspective view of a compact spectrophotometer incorporating principles of the invention.

FIG. 1 is a perspective view of a compact, portable spectrophotometer 100 incorporating principles of the invention. The spectrophotometer includes a housing 101 containing the optics and electronics for performing color measurements of object samples and a shoe 102 hingedly attached to the housing 101. A plunger 105 disposed near one end of the housing 101 activates a read switch when the housing 101 is pivoted to a position immediately adjacent to the shoe. The shoe 102 is provided with a removable aperture 104 for alignment of the sample under test with the instrument's optical path. An object sample to be tested for color is placed under the shoe 102 and aligned to the aperture 104. Thereafter, the housing 101 is pivoted in the direction of the shoe, causing the plunger 105 to be actuated and initiating a measuring sequence. The measuring sequence includes illumination of the object sample through the aperture 104 by means of a plurality of lamps inside the housing 101 and the rotation of a filter wheel provided with a plurality of filters each specifically adapted to measure a particular wavelength. In one embodiment of the invention, 16 such filters are provided to measure light at different wavelengths from 400 nanometers to 700 nanometers, at 20 nanometer intervals. More or fewer filters may be employed, depending upon the desired degree of accuracy in the color measurement. Light reflected from the object sample is conducted via the aperture 104 through an optical system and the filters of the filter wheel and onto a photoelectronic detector which provides an analog output indicative of the intensity of the received light. The analog output of the detector is integrated over time to generate an output signal indicative of total light received through a particular filter. The resulting signal is computed by means of standard signal processing technique using a microprocessor, in a well known fashion to derive optical data which can be used to derive tristimulus colormetric system values or other standard color scale values. The system includes a side sensor by which the light level of at least one of the illuminating lamps is monitored through the filters of the filter wheel. The output of the side sensor is used to compensate for variations in light intensity.

Synchronization of the signal processing circuitry with filters in the wheel is accomplished by monitoring, for at least one rotation, the magnitude of light received via each of the filters and comparing the light output until a substantial change in light output occurs, e.g., from a relatively high level to a significantly lower level. This indicates the transition from the higher wavelength filter to a lower wavelength filter, e.g. from the 700 nanometer wavelength filter to the 400 nanometer wavelength filter. The relative position of other filters on the wheel is derived from information stored in a microprocessor memory such as a ROM.

The spectrophotometer of the present invention may be used for a number of applications besides the measurements of reflectance. It will be apparent that transmittance may also be readily measured by providing an appropriate light source on the opposite side of the sample to be measured, which light is transmitted through the sample and through the filters of the filter wheel onto the photodetector. In another application, the device may be used as a strip reading spectrophotometer by providing a mechanism for automatically advancing a color strip adjacent the aperture 104 by means of a strip advancing mechanism such as described in U.S. Pat. No. 5,062,714 to Peterson et al. or co-pending application Ser. No. 08/045859 filed Apr. 12, 1993, to Bowden et al. using the method for pattern recognition described in Peterson et al. Furthermore, the present device may be used to determine color on a cathode ray tube (CRT) by positioning the device over an area of the CRT and measuring a color at various wavelengths of the different phosphors mixtures used in the CRT. When the device of the present invention is used to measure color in a CRT, the illumination lamps provided in the device may be used for synchronization purposes and turned off during color measuring operation.

Figure 2:
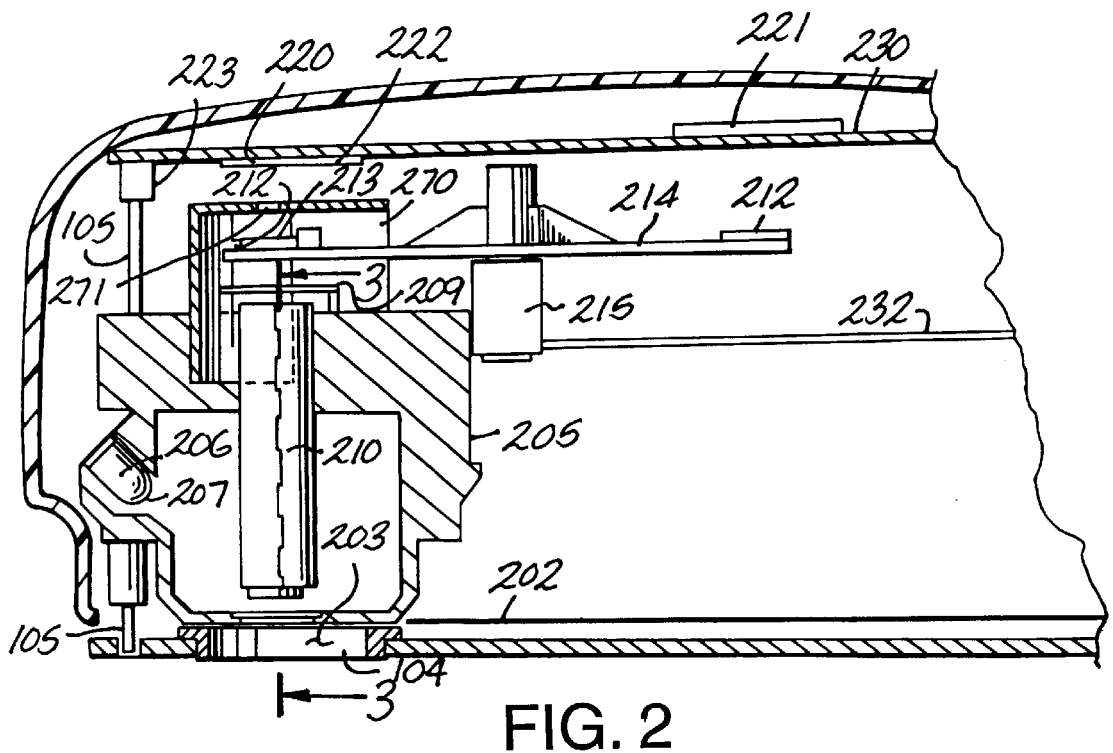
FIG. 2 is a partial cross-sectional view of the spectrophotometer of FIG. 1 showing certain of the basic elements of the invention.

FIG. 2 is a partial cross sectional representation of a portion of the spectrophotometer 100 of FIG. 1. In FIG. 2, the shoe 102 is shown immediately adjacent the lower wall 202 of housing 101. The lower wall has an opening 203 in alignment with the aperture 104 in shoe 102.

FIG. 2 shows an optics unit 200 outlined in broken lines, including a lamp support housing 205 which supports a set of three lamps 206 circumferentially spaced apart by 120°. Each of the lamps 206 is arranged at a 45° angle to a vertical direction and illuminates an object sample placed under the aperture 104 such that the light is reflected in the vertical direction from the object sample. The reflected light is conducted through a light path including a cylindrically shaped conduit 210 and a common blocking filter 209 to an interference filter 213, retained in filter housing 212, disposed in alignment with conduit 210. Light projected through the filter 213 is projected onto a photodetector sensor 220. A side sensor 222 is provided to sense a reference beam. These sensors may be any of a number of well know photodetectors typically used in calorimeters. The sensors 220 and 222 are mounted on a circuit board 230. The circuit board 230 also supports a microprocessor 221 and a read switch 223 which is activated by the plunger 105. Additionally, the circuit board 230 is provided with interconnecting wiring between these units and the various other components of the system. A light shield 270 serves to shield the filters from extraneous light. The shield 270 is provided with openings 271, 273 in register with sensors 220 and 222, respectively.

The filter housing 212 is mounted on a filter wheel 214 which comprises a number of such filter housings 212. The filter wheel 214 is driven by an electric motor 215 mounted indirectly to the lamp support housing 205. The motor 215 and lamp 206 are electrically connected to the circuit board 232 and receive power from a battery or external power source (not shown in the drawing) via board 232. The circuit boards 230 and 232 are electrically interconnected and operation of the motor 215 and the lamps 206 are controlled by the microprocessor 221 in conjunction with the read switch 223 on board circuit 230. Each of the lamps 206 projects light through the aperture 104 at a 45° angle to a vertical axis extending through the light conduit 210 and filter 213. Each of the lamps 206, is provided with a collimating lens 207 to provide collimated light to the object sample. The lamps 206 are preferably single element lamps which project elliptical beam. The lamps are arranged within the housing 205 such that the longitudinal axes of the three lamps intersect at a plane below the lower surface of the aperture 104 to assure ample illumination at the reading surface adjacent the lower surface of the aperture 104. By placing the focal plane below the reading surface, ample illumination is provided at distance below the reading surface. Because the incident light is collimated, the reflected light tends to be collimated to some degree as well. The reflected light is collimated by the light conduit 210 directing the reflected light to the filters.

Figure 3:
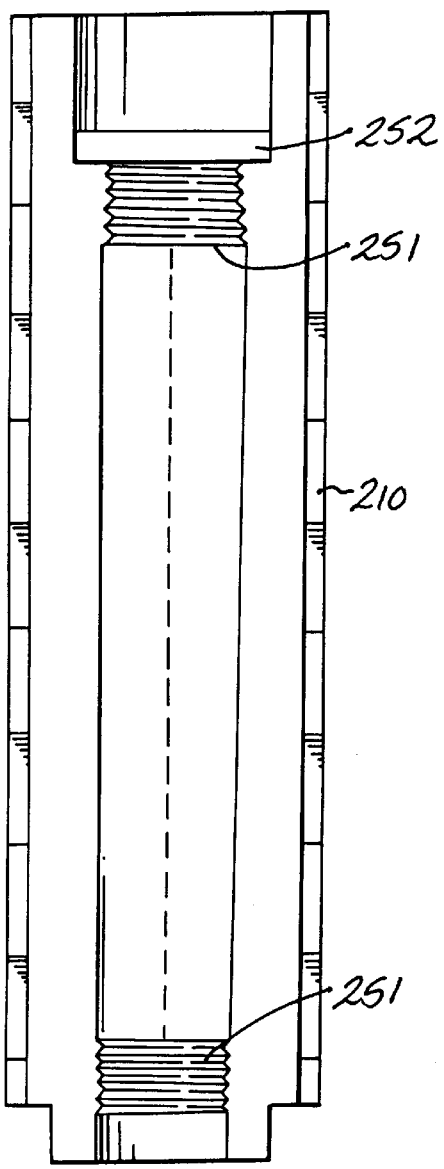
FIG. 3 is an elevational view of a one half section of an optical conduit shown in FIG. 2.
Figure 4:
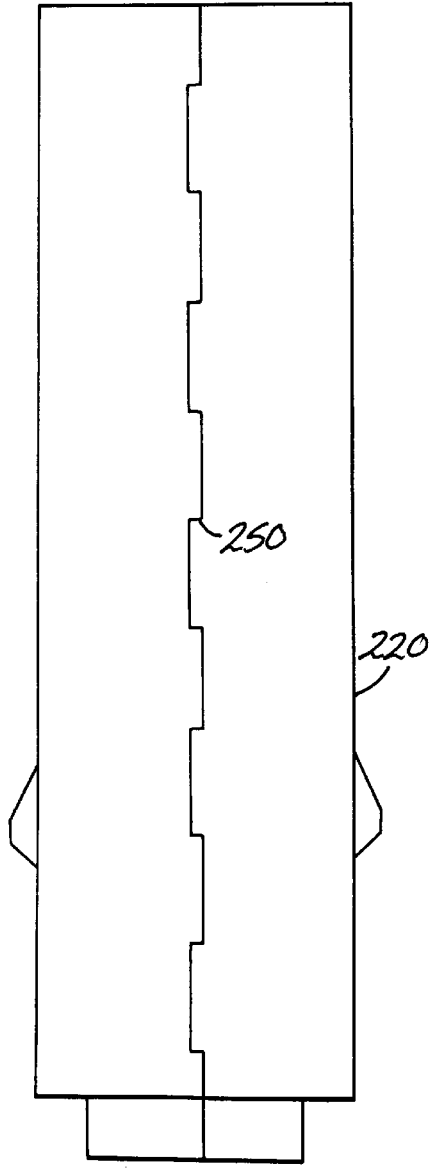
FIG. 4 is an elevational view of an optical conduit shown in FIG. 2.

The light conduit 210 is shown in greater detail in FIGS. 3 and 4. The optical conduit is preferably made out of two molded halves which are joined along their sides by means of a snap fit as generally depicted at 250 in FIG. 4. Each half is provided with a plurality of circumferentially extending baffles 251 as shown in FIG. 3. The circumferential baffles serve to further collimate the light reflected form the object sample by absorbing stray radiation. The conduit 210 is further provide with the lens 252 with a relatively short focal length. The lens 252 provides a high intensity light beam to the filter 213 and the photodetector 220 (shown in FIG. 2) and serves to reduce edge leakage in the filter 213.

Figure 5:
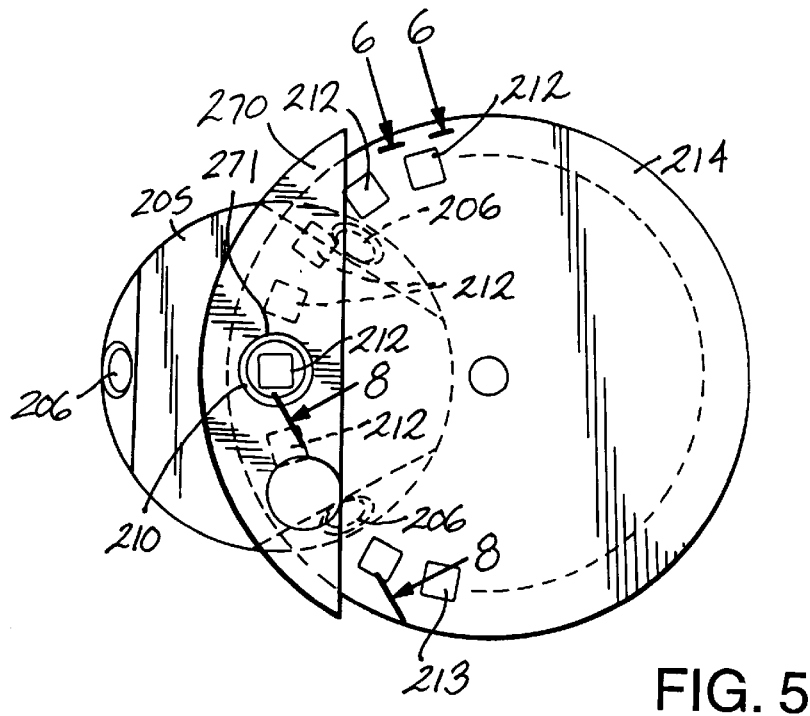
FIG. 5 is a diagrammatic representation of a filter wheel and lamp housing employed in one embodiment of the invention.

FIG. 5 is a top view of the filter wheel 214 showing in plurality of filter retainers 212, each comprising one filter 213. The filter retainers 212 are rectangularly shaped, preferably square, and the filters 213 are square as well. The filters 213 are produced in a well know manner by the deposition of oxides on different kinds of glass to obtain filter which passes light at the desired wavelength only. Such filters are typically produced by the deposition of a rare earth oxides on a sheet of glass and cut into a rectangularly shaped filter elements and are then made into a circular shape by a grinding operation. In one embodiment of the invention, the filter retainers 212 are square and the filter elements 213 are square elements, thereby avoiding the customary grinding operation. Furthermore, rectangularly shaped filters may be more readily made in small dimensions which is advantageous for the present application where the objective is to make the filter wheel and the entire spectrophotometer as a compact and relatively inexpensive unit.

Figure 6:
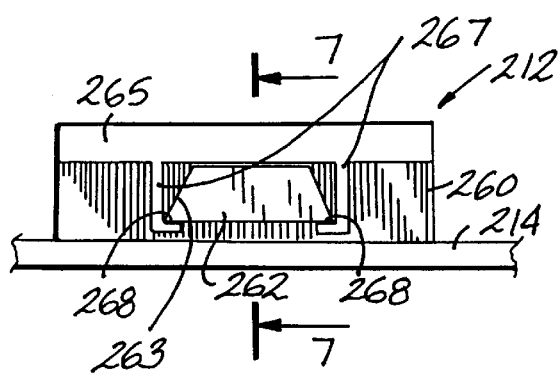
FIG. 6 is a breakaway side view of a portion of the filter wheel showing a filter housing.
Figure 7:
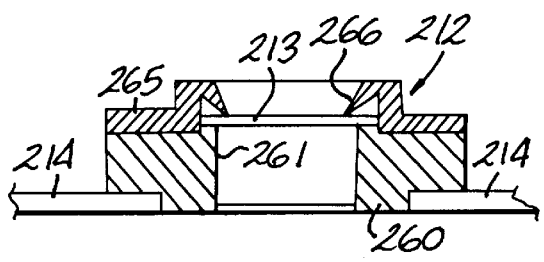
FIG. 7 is a cross-sectional view along line 7—7 of FIG. 6.

FIG. 6 is a breakaway end view of a portion of the wheel 214 and an end view of the filter retainers 212. FIG. 7 is a cross-sectional view of the retainer 212 along line 7—7 of FIG. 6. The retainer 212 includes a lower housing 260 provided with an annular shoulder 261 on which the filter 213 is supported. A cover 265 is provided with an annular flange 266 extending over the shoulder 261 and a portion of the filter 213 to retain the filter in the desired position. The cover 265 is retained on the housing 260 by means of a snap fastener arrangement. The snap fastener arrangement includes a pair of arms 267 formed integral with the cover 212, each provided with a perpendicularly extending lip 268 which engages a retainer 262 on the lower housing 260. The retainer 262 is provided with upper slanting surfaces 263 to force the arms 267 apart when the cover 265 is pressed onto the housing 260. The retainer 262 is further provided with shoulders 264 which engage perpendicularly extending sections 268 of the arms 267. By this arrangement, individual interference filters 213 are firmly retained on the filter wheel 214 in the presence of centrifugal forces exerted on the filter and designed to withstand normal handling of the portable, hand-held instrument, and are individually removable. Furthermore, the present arrangement serves to seal the edges of the filters, to prevent light from bypassing the filters.

Figure 8:
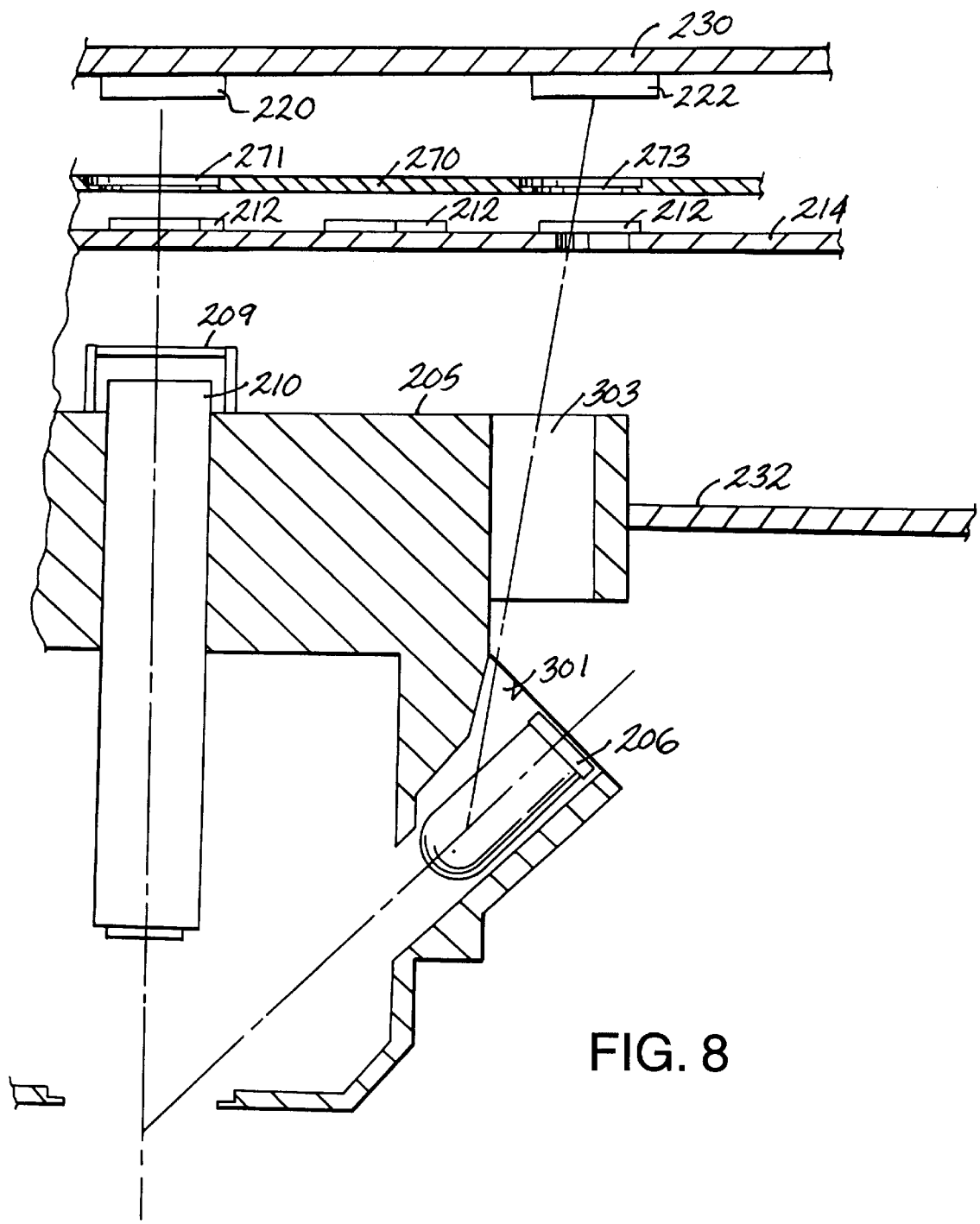
FIG. 8 is an enlarged breakaway partial cross-sectional view of the lamp housing shown in FIG. 2.

FIG. 8 is a breakaway partial cross-sectional view showing a portion of the lamp housing 205 and one of the lamps 206. As stated earlier, the lamp housing comprises three lamps 206 which are circumferentially spaced apart by 1200. One of the lamps is preferably positioned in alignment with a longitudinally extending center line through the device 100. That lamp is shown in cross-section in FIG. 2. FIG. 8 shows a lamp 206 spaced apart from the lamp shown in FIG. 2 by 120° in the counter-clockwise direction as one views the instrument shown in FIG. 1 from an upper position. The lamp housing 205 is provided with a flat surface area 301 to facilitate installation and positioning of the lamps 206 within the lamp housing. Also shown in FIG. 8 is a portion of the filter wheel 214 and of the circuit board 230. The filter wheel shows three of the filter housings 212 spaced circumferentially along the wheel 214. For the sake of clarity, only these three filter housings are shown. As discussed earlier, light reflected from an object sample is conducted through the optical conduit 210 and through one of the filters 212 and is received by an electro-optic sensor 220, shown in alignment in FIG. 8.

It is a common practice in the design of calorimeters with an integral light source to obtain a reference beam from the light source for the purpose of deriving a reference signal. The reference signal is used in conjunction with a signal derived from the reflected beam to generate spectral data. Furthermore, the intensity of the light source is typically monitored to compensate for variations in intensity occurring over time.

In accordance with the present invention, the reference beam is derived from one of the lamps 206 through each of the filters 212 which are provided on the filter wheel 214 for the purposes of filtering the light reflected from the object sample under test. As shown in FIG. 8, the lamp housing 205 is provided with a slanted bore 301 in the housing 205 adjacent one side of the lamps 206. A vertically extending bore 303 in the housing 205 serves to provide a path for the light to be projected from the lamp 206 through a filter housing 212 of wheel 214 onto the side sensor 222. The relative position of a filter housings 212 on the filter wheel 214 is dictated by the number of filters used, e.g., 16 or another desired number. Furthermore, the position of the illuminating lamps from which the referenced light is detected is dictated by the preferred angle of the lamp and preferred distance of the lamp from the object sample. A slanted bore 301, shown in FIG. 8, is provided adjacent the lamp 206 to direct light to the vertically extending bore 303. These bores are positioned to allow for projection of light from the lamp 206 through the bore 301 onto a filter in a selected one of the housings 212. The side sensor 222 is positioned in alignment with the housing 212 selected to receive the light from the lamp 206. In the present arrangement, the housing 212 selected for receiving the direct light from the lamp, is two positions removed from the housing 212 which receives the reflected light from optical conduit 210 and which is directed onto the sensor 220. Thus, the reference beam, used in the computation of light intensity reflected from the object sample is detected through a filter at a wavelength in the range of the filter through which the reflected light is received. This allows for greater accuracy of measurement. Furthermore, the reference beam is generated in synchronism with the reflected test beam since they are received simultaneously through filters on the rotating filter wheel 214.

Figure 9:
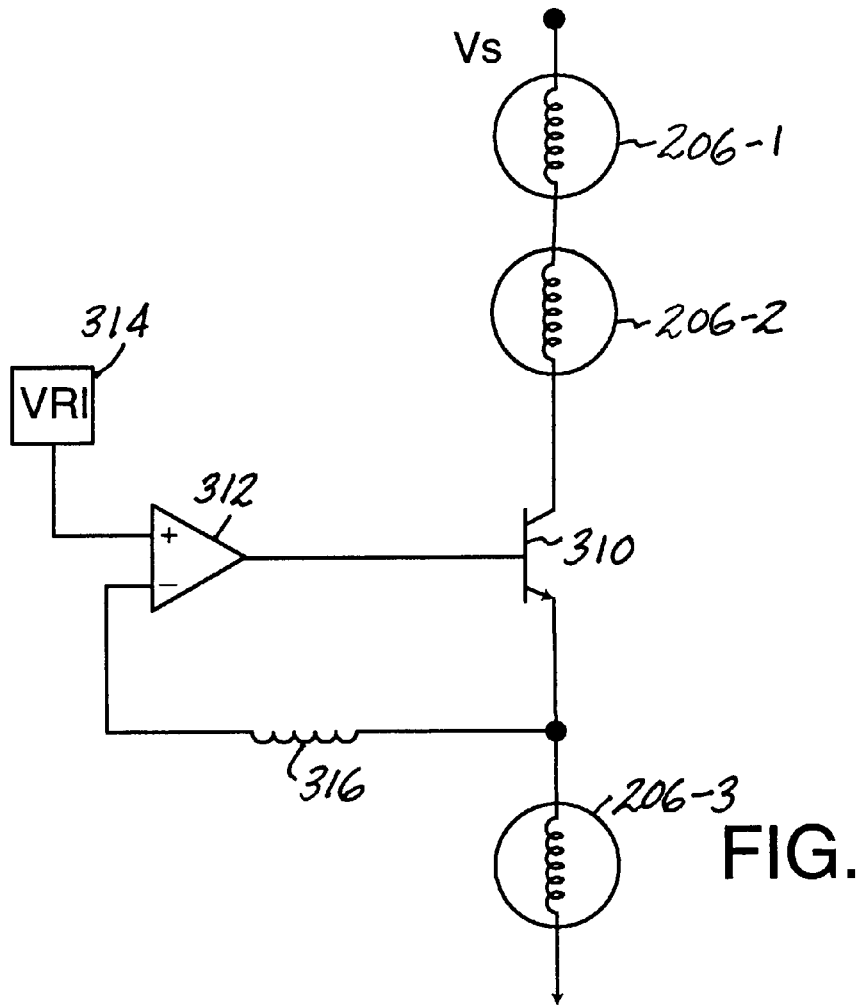
FIG. 9 is a circuit diagram representation of a lamp driver circuit.

FIG. 9 is a circuit diagram representation of the lamp driver circuit which drives the three separate lamps 206 mounted in the lamp housing 205, as shown in FIGS. 2 and 8. The three separate lamps are designated as 206-1, 206-2 and 206-3 in FIG. 9. The current through the lamps is regulated by the transistor 310 from a differential amplifier 312 which has one input connected to a reference voltage signal generated by voltage reference source 314. The other input of the amplifier 312 is connected to the positive voltage side of lamp 206-3 through a feedback resistor 316. The three lamps 206 are matched for light output versus current such that equal currents in the three lamps causes the lamps to produce equal and balanced light output. Since the three lamps are series connected, as shown in FIG. 9, a substantially identical current will flow through all three lamps. The differential amplifier 312 and the feedback resistor 316 serve to maintain a constant voltage at lamp 206-3. Since the three lamps are selected to have substantially identical characteristics, it is safe to assume that changes due to aging or drifting will be nearly the same for all three lamps. Therefore, it's only necessary to monitor light output from one of the lamps, preferably the regulated lamp 206-3. In the present embodiment, the lamp 206 shown in FIG. 8, from which light is projected through the slanted bore 301 and the vertically extending bore 303 on to side sensor 222, is the regulated lamp.

Figure 11:
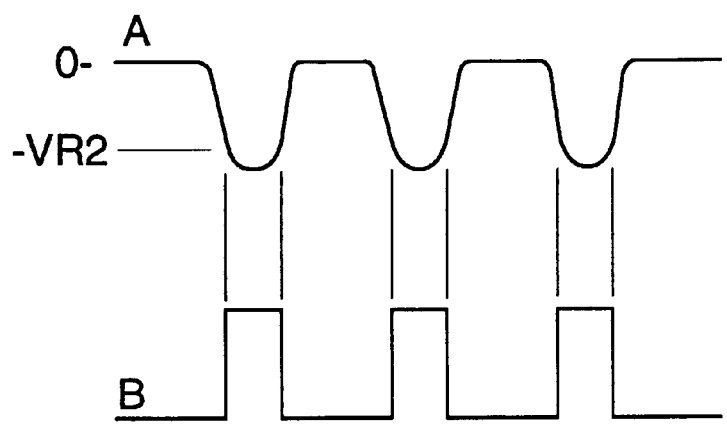
FIG. 11 is a diagrammatic representation of signals generated in the circuitry of FIG. 10.
Figure 10:
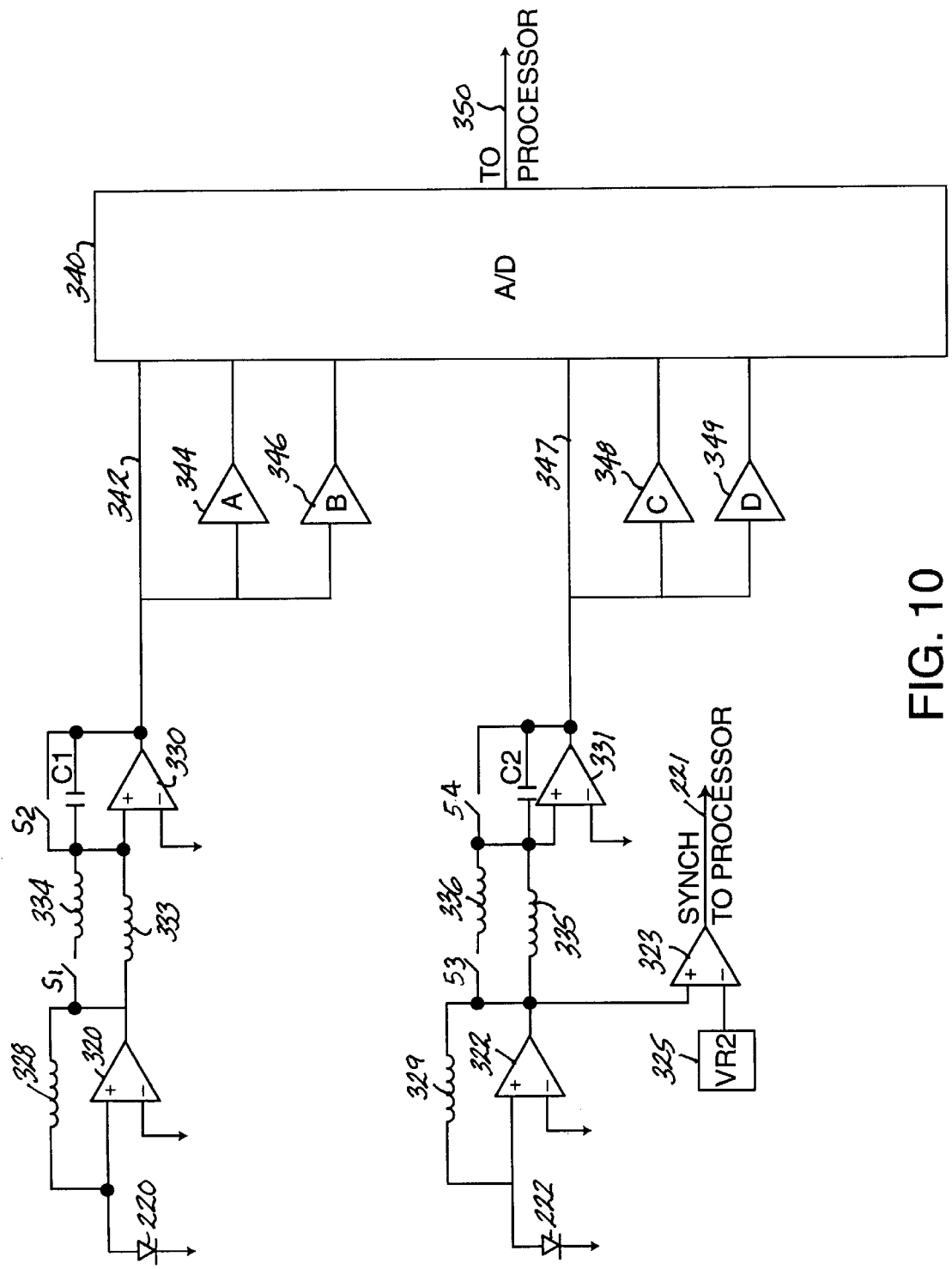
FIG. 10 is a circuit diagram representation of signal processing circuitry.

FIG. 10 is a circuit diagram representation of signal processing circuitry connected to the primary sensor 220 and the side sensor 222. The sensors 220 and 222 are shown in FIG. 10 as in a photodiode representation having one side connected to ground. The sensor 220 is connected to input of operational amplifier 320 and sensor 222 is connected to an input of operational amplifier 322. Light from the lamp 206-3 is projected through the filters 213 onto the detector 222 as wheel 214 is rotated. The amount of light which passes through the filter onto side sensor 222 first increases and then decreases as the filter moves into the light path and then out of the light path due to the rotation of the wheel. This produces an electrical output signal for each filter as it passes the lamp 206-3. The signal from side sensor 222 is amplified by means of operational amplifier 322 and applied to one input of a comparator 323. The other input of comparator 323 is connected to a reference voltage source 325 providing a voltage VR2 to comparator 323. FIG. 11 is a signal diagram representation of the signals generated by operational amplifier 322 and comparator 323. The output signal of operational amplifier 322 is a negative going signal varying between ground level and a magnitude below ground level, as shown in FIG. 11 at A. When the magnitude of the signal generated by operational amplifier 322 exceeds that of the reference voltage VR2, the comparator 323 generates a positive output signal. When the output of operational amplifier 322 falls again to a level greater than the negative VR2, the output signal of the comparator 323 returns to the prior state. FIG. 11 shows the output signal of comparator 323 at B. A series of pulses generated by the comparator 323 as a result of the rotation of filters passed the lamp 206-3 is transmitted to the processor 201 as synchronization pulses.

The signal produced by the primary sensor 220 in response to light reflected or emitted from an object under test is applied to an input of operational amplifier 320 and to integrator circuit 330 connected to operational amplifier 320. Operational amplifier 320 and 322 are each provided with standard feedback resistors 328 and 329, respectively. A pair of resistors 333 and 334 are connected in parallel between the output of the operational amplifier 320 and the input of the integrator circuit 330. Furthermore, a switch S1 is connected in series with the resistor 334 to provide a variable resistance path between the operational amplifier 320 and integrator 330. A capacitor is connected between the input terminal of integrator 330 connected to operational amplifier 320 and the output of integrator circuits 330. A switch S2 is provided in parallel with the capacitor C1 to allow the capacitor C1 to be effectively removed from the circuit. The output of the integrator 330 is connected to an analog-to-digital (A-to-D) convertor 340 having an output connected to the control microprocessor 221. Three parallel paths are provided between the output of the integrator 330 and the A-to-D convertor 340 including a first path 342 representing a direct connection without further gain. A second path connected in parallel with the path 342 includes an amplifier 344 of a predetermined gain and a third path includes an amplifier 346 having a different gain than the amplifier 344.

The output of operational output 322 is connected through a pair of parallel resistors 335 and 336 to an input of integrator circuit 331. A switch S3 is provided in series with the resistor 336 to allow for a variable resistance to be provided between the operational amplifier 322 and the integrator 331. A capacitor C2 is connected between the input and output of the integrator 331. A switch S4 is connected in parallel with the capacitor C2 to allow the capacitor to be discharged. The output of integrator 331 is connected to the A to D convertor 340 via a first path 347 in which no gain is provided. A second path including amplifier 348 having a predefined gain and a third path including amplifier 349 having a different value of gain are connected in parallel with the first path 347 into the A to D convertor 340. The A to D convertor 340 includes multiplex circuitry which multiplexes the signals from the paths 342 and 347 and the paths including amplifier 344, 346, 348 and 349. The multiplexed signals are converted to digital signals on output 350, which is connected to the processor 221. The switches S1, S2, S3 and S4 may be transistors or other switching elements operable in response to pulses from the processor 221.

When the color measurements cycle is started by operation of the read switch 223 (FIG. 2), the processor 221 initiates rotation of the motor 215. During one of the first rotations, the amplitudes of the signals from the two sensors 220 and 222 are sampled to determine the correct settings for switches S1 and S3 and also to determine whether the no-gain paths 342, 347 or the outputs of any of the gain amplifiers 344, 346, 348 and 349 will be used. These determinations may be based on an optimization routine to achieve the best signal-to-noise ratio for each of the filters 213. Thereafter, measurements can be made to determine the proper gain setting for the integrators 330 and 331 along with the selection of gain amplifiers 344, 340, 346, 348 and 349, again based on best signal-to-noise ratios. The information relating to the optimum settings for each of the filters is recorded in memory and just before a particular filter passes through the light path aligned with the sensor 220, the switches S1 and S3 are set according to that filter's sensitivity and the switches S2 and S4 are opened to allow the integrator circuits 330 and 331 to charge capacitors C1 and C2, respectively, to a voltage level that is proportional to the total amount of light passing through the particular filter as it moves through the primary sensor light path and the side sensor light path. After a filter has passed through a light path, the light path will be blocked by a portion of the wheel 214 extending between adjacent filters. During this time period, the voltage on the integrators 330, 331 will be held at a level which represents the magnitude of the light through the filter which has just been passed through the light path. The output state of the integrators 330 and 331 are sampled by the A to D convertor. After a period of time sufficient for appropriate sampling, switches S2 and S4 are closed under control of the processor 221 to reset the voltage of the integrator circuits 330 and 331 to a known level. This cycle is repeated for each filter as it passes through the light path lined with the side sensor 222 and as it passes through light path aligned with the primary sensor 220. It is noted that the integrate, hold and A-to-D conversion cycle can in many cases be completed in the time periods between alignment of two consecutive filters with the light paths. This allows measurement of the system with the light path blocked. Such measurements may be used to subtract offset errors in the circuit and the optical system. Advantageously, because the integrated hold circuitry of FIG. 10 samples all of the light that passes through the filter as it rotates, the design is insensitive to speed variation. Whether the speed increases or decreases, all light will still be integrated by both detectors 220 and 222. Thus, compensation can be made for variations in light intensity from the lamps 206 independent of the speed rotation of the wheel.

In one embodiment of the invention, the motor 215, which is used to accelerate the wheel from a stopped position and to maintain the wheel at a constant speed, is a stepper motor. The mass of the wheel 214 requires a speed-up ramp in order for a small motor to properly start the wheel rotating and achieve the desired speed within a desired time period. The stepper motor is driven by a conventional two or four-phase stepper motor drive responsive to input pulses from processor 221. The frequency of the input pulses is preferably increased in a non-linear fashion to start the motor rotating in the correct direction and to achieve the desired speed. A conventional DC or AC brush or brushless motors could also be used.

While most of the foregoing description was made with reference to the detection of reflected light, the present device may also be used to measure incident light such as produced, for example, by a cathode ray tube CRT. The procedure for determining the correct settings of the switches S1 and S3 and the selection of the gain paths including the gain amplifiers 344, 346, 348 and 349, when measuring incident light is accomplished by initially turning on the lamps 206 and taking measurements through each of the filters to determine a position of each wavelength filter from the intensity of the received light. Thereafter, the lamps 206 may be turned off and the steps of the stepper motor may be counted in a known fashion to keep track of the position of each of the filters. In this manner, incident light from a CRT or the like can be measured at predetermined wavelengths by taking into account only the output of the specific filters pertaining to the wavelengths of interest.

To compensate for changes in intensity of the light produced by the three lamps 206 the spectrophotometer is calibrated to derive compensation coefficients which are used to provide normalization of spectral values. A preferred method of calibration and compensation is described in the commonly-assigned co-pending application, Ser. No. 07/975,981, filed Nov. 13, 1992, which is a continuation of application 07/679,995 filed Mar. 29, 1991, which, in turn, is a continuation of application Ser. No. 07/487,670, filed Mar. 1, 1990. That application is incorporated by reference herein. As stated in that application, a series of time-sequenced measurements at equally-spaced apart intervals are made of a reference sample, in addition to corresponding side-sensor measurements. These measurements are utilized in the computation of compensation coefficients for each filter of the plurality of filters 213 on the filter wheel 214. The compensation coefficients are indicative of the relationship between changes in side-sensor measurements and reflectance measurements as the intensity of the light provided by the lamps 260 changes. These compensation coefficients are utilized, with side-sensor measurements to provide normalization of reflectance measurements for each filter and for each measurement within the time sequence. For each filter, a scale factor is determined. The scale factors, together with the compensation coefficients and side-sensor measurements, are employed to compensate actual reflectance measurements. When the spectrophotometer is used for the measurement of incident light from a source such as a CRT, light sampled during reflection calibration can be compared to a light from a calibrated CRT and the unit can be factory calibrated for incident light intensity measurements.

Figure 12:
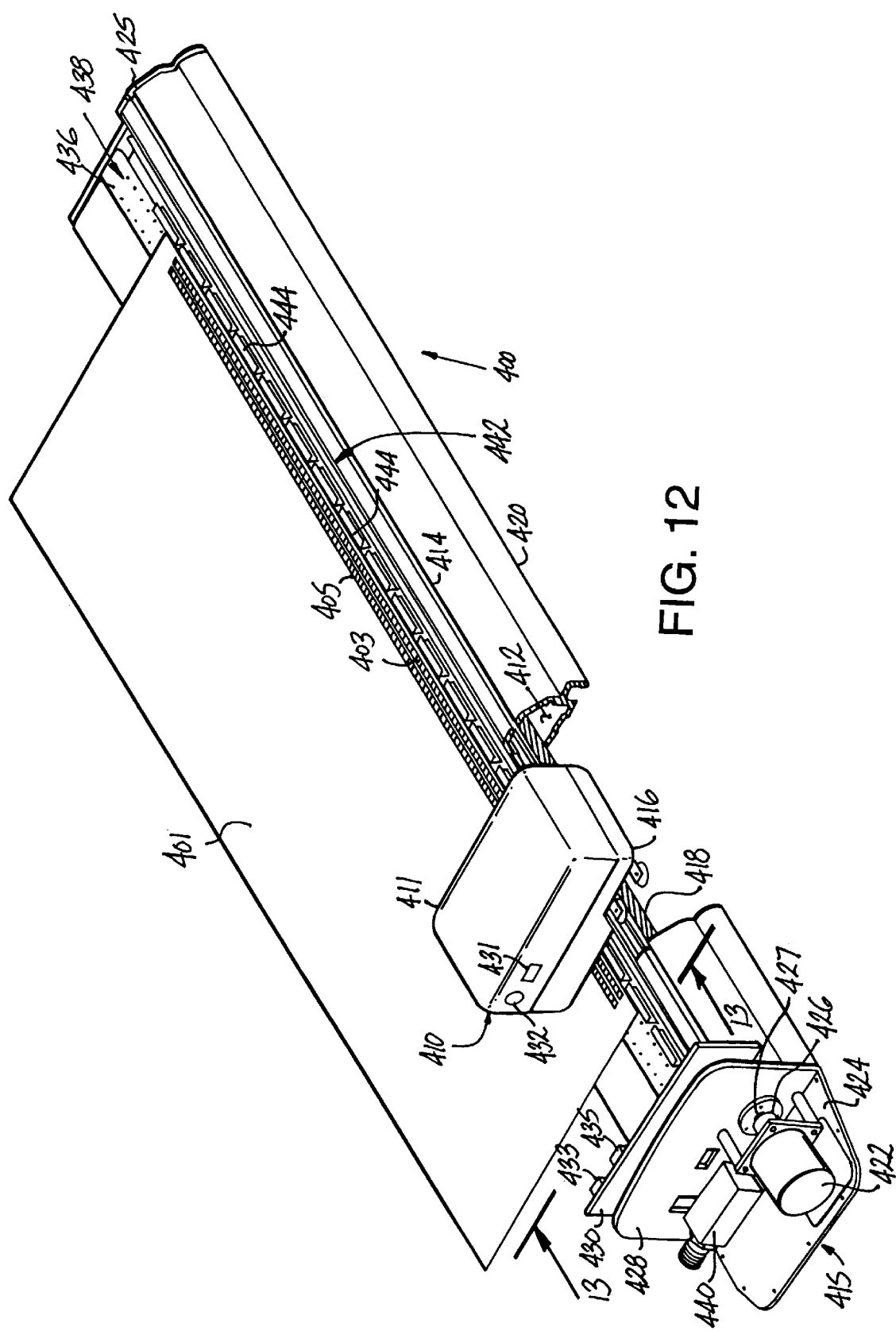
FIG. 12 is a perspective view of a scanning calorimeter incorporating principles of the invention.

FIG. 12 shows the scanning calorimeter 400 with a sheet 401 placed in position for measurement. The sheet 401 is provided with two separate and distinct rows of color patches 403, 405. The colorimeter 400 comprises a colorimeter head 410 movably supported on a support base. The base includes a docking end 415 and a distal end 425. The base 400 is preferably a single extruded unit comprising a longitudinally extending transport chamber 412 shown in a partial breakaway view in FIG. 12. The chamber 412 is provided with a longitudinally extending slotted opening 414 extending in a direction which will be referred to herein as the direction of the X-axis. The head 410 is removably mounted on an X-axis transport 416.

As will be described in greater detail later herein with reference to FIG. 13, the transport 416 comprises a neck piece disposed in the slot 414 and supporting the head 410. The transport 416 is moved in the chamber 412 in the direction of the X-axis by engagement with a helical lead screw 418. The lead screw 418 is driven by means of a stepper motor 422 supported on a vertical plate 428 joined to base plate 424 and disposed at one end of the colorimeter referred to as the docking end 415. The motor 422 drives the lead screw 418 which is supported at an opposite end in end plate 425. An end of the lead screw 418 extends through plate 428 via thrust bearing 427. The flexible coupling is mounted on a vertical plate 428 and engages the lead screw 418 through the vertical plate 428.

Mounted on the vertical plate 428 is a circuit board 430. The read head 410 is an autonomously operating read head of a type generally described in U.S. Pat. No. 5,073,028, which is not connected by electrical wiring with a stationary unit, as is the case in most scanning calorimeters. The read head 410 typically travels from the docking end to a predefined location and collects color data representative of color readings as it returns toward the docking end over the color patches on the sheet. The color data is stored in a memory internal to the read head and when the read head 410 has returned to the docking end, the data is transferred by means of an optical coupler 432 on the head 410 and a corresponding optical coupler 433 on the circuit board 430. The circuit board 430 will also include an electrical coupler 434 for interconnection with corresponding electrical coupler on the circuit board 430. The head 410 will include a battery which is charged when the head 410 is in the docking position adjacent to the circuit board 430 such that the electrical coupler 434 is in contact with the corresponding coupler 435 on the circuit board 430.

The base 420 is provided with a vacuum chamber having an upper surface 436 and provided with a plurality of vacuum holes 438. A vacuum is applied to the vacuum chamber by means of a vacuum manifold 440 which communicates with the vacuum chamber through the vertical plate 428. By applying a vacuum to the manifold 440, a sheet to be measured, such as the sheet 401, is drawn into contact with the upper surface 436 to maintain the sheet in a flat position on the surface 436.

A paper stop 442 comprises a plurality of retractable sections 444. As described further later herein, the paper stop comprises a flexible material mounted on the base 420 and when the head 410 is moved along its path of travel, it contacts the retractable sections 444 in sequence. In this manner, the paper stop sections 444 are moved in a direction away from the sheet 401 to allow the optics portion of the head to read color bars adjacent the edge of the sheet 401 abutting against the paper stop 442.

Figure 13:
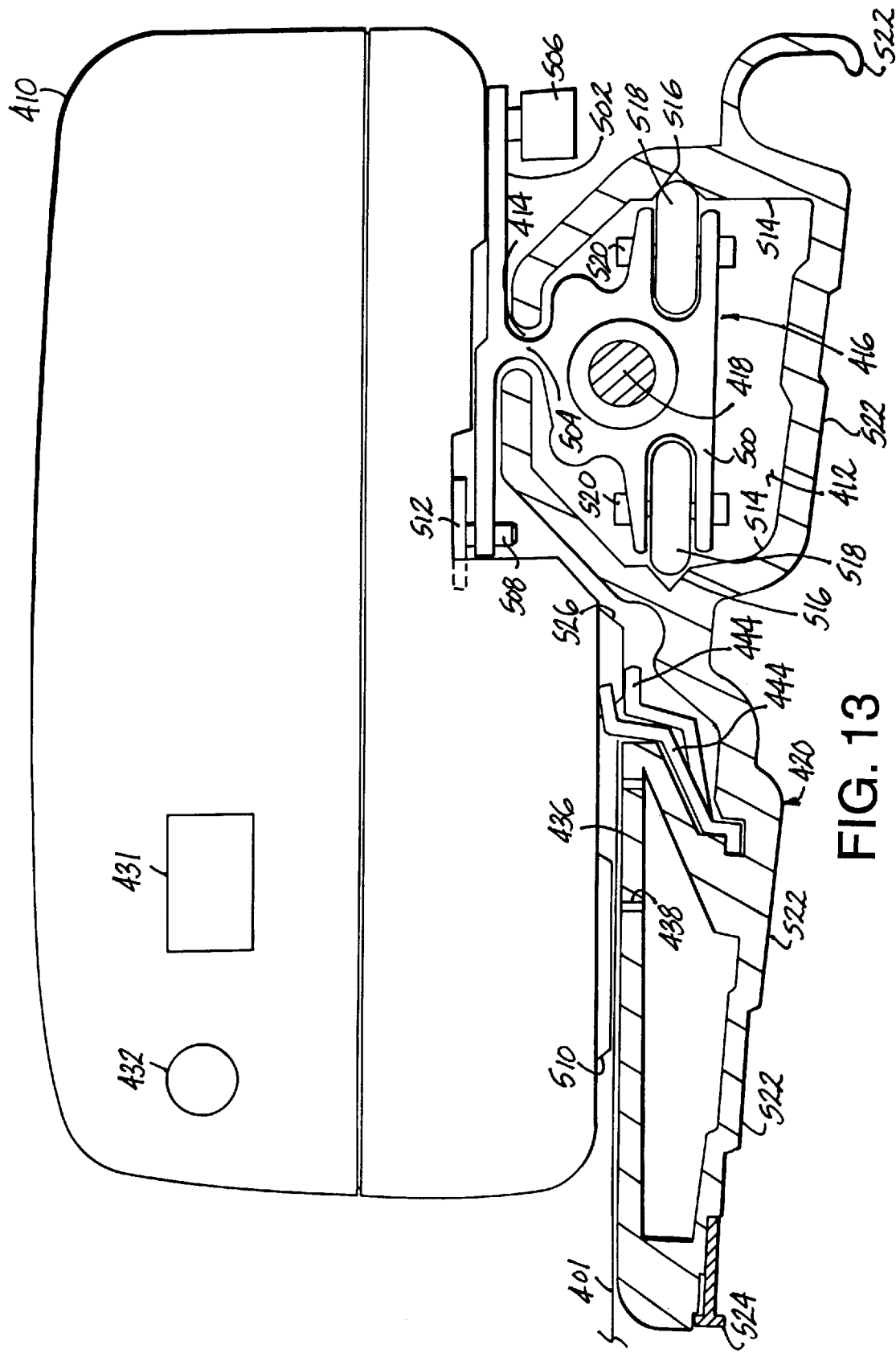
FIG. 13 shows the colorimeter base in cross section and the colorimeter head.

FIG. 13 is a cross sectional view along line 2—2 of FIG. 12. FIG. 13 shows the chamber 412 with slotted opening 414 and the axis transport 416 is supported in the chamber 412. The transport 416 comprises a support structure 500 and a platform 502 connected to the support structure 500 via a neck piece 504. The calorimeter head 410 is supported on the platform 502 and is fastened to the platform 502 by means of at least one mounting screw 506. Preferably, two such mounting screws are provided, in a spaced-apart relationship, extending through the platform and engaging the colorimeter head. The platform 502 mounts a head alignment screw 508. The head alignment screw 508 serves to raise and lower the portion of the calorimeter head 410 engaging the alignment screw, thereby adjusting the distance between the optics extension 510 of the colorimeter 410 and the upper surface 436 of the base 420. Due to space constraints, it may be desirable for the head 512 of the alignment screw 508 to extend into a portion of the colorimeter head 410, as indicated by broken lines in FIG. 13. Preferably two such head alignment screws, spaced-apart in the direction of the X-axis, are incorporated in the platform 502. The head alignment screw 508 is preferably adjusted at the factory for proper spacing of the optics extension 510 from surface 436. The separate adjustment screw allows a head to be replaced with another head of same physical dimensions without the need for readjustment.

The chamber 412 is provided with opposing side walls 514. Grooves 516, extending in the direction of the X-axis are provided in the side walls 514. The support structure 500 is equipped with a pair of wheels 518 supported on shafts 520 in the support structure 500. The horizontally-extending wheels 518 engage the grooves 516 in the walls 514 to movably support the transport 416 in the chamber 412. The support structure 500 is provided with a central throughbore 522 provided with a helical thread engaging the helical thread of lead screw 418. As mentioned earlier with respect to FIG. 1, the lead screw 418 is turned by stepper motor 422, preferably under control of control processor (not shown in the drawing). As the lead screw 418 is turned, the transport 416 is moved in the direction of the X-axis, thereby moving the calorimeter head 410 in the direction of the X-axis over the surface 436 and color patches on a paper disposed on surface 436.

The base 420 is provided with a number of support areas 522 which are intended to rest on a flat surface, such as a table. The support areas extend at an angle to the upper surface 436 to facilitate placement of the sheet 401 on the surface 436 and to reduce buckling of the sheet 401 in a direction perpendicular of the X-axis. The base 420 is provided with flexibly mounted paper stop 524. The paper stop is biased in a direction away from the paper 401 and toward a table or other surface on which the colorimeter 400 rests. The paper stop is provided to prevent sheets pushed against the edge of the colorimeter 400 from sliding under an edge of the unit.

FIG. 13 shows retractable sections 444 of the paper stop 442 in side view. One of the sections 444 is shown in the normal position for engaging an edge of the sheet 401. Another of the retractable sections 444, disposed under the head 410 is shown in the retracted position. The head 410 is provided with a protrusion 526 which forces a retractable section 444 of the paper stop 442 disposed under the head 400 to be moved to the retracted position. As described further later herein with reference to FIG. 14, the head 401 comprises a Y-axis transport which moves the optics of the head, including optical extension 510 in the direction of the Y-axis, perpendicular to the direction of the X-axis. The retractable sections 444 of the paper stop 442, when moved to the retracted position, allow the optics extension 510 to be placed adjacent color patches immediately adjacent the paper's edge.

Figure 14:
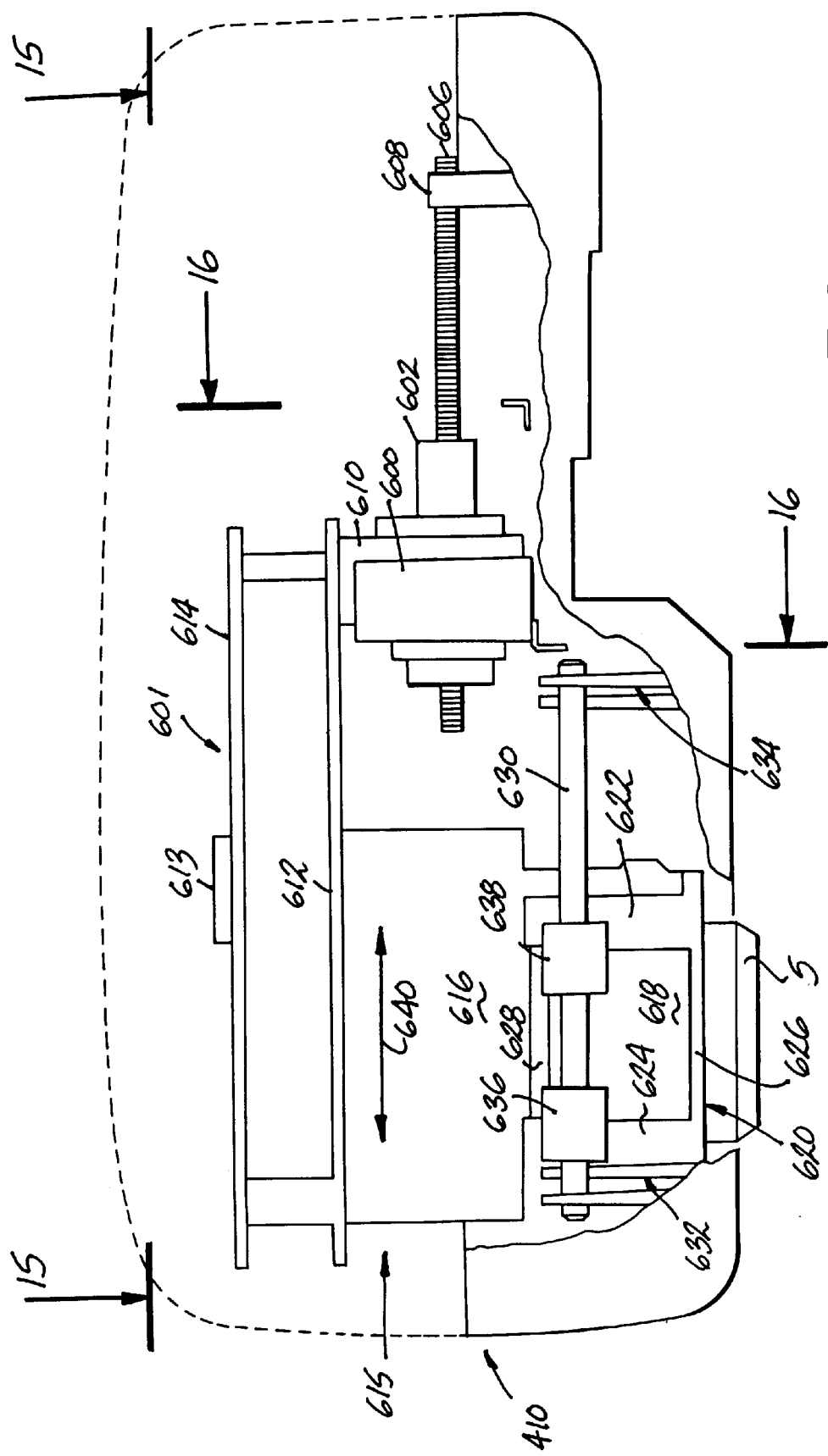
FIG. 14 is a partial cutaway side elevation of the colorimeter head with its upper cover removed.

FIG. 14 is a side elevation of the head 400 in a partial breakaway view. As shown in FIG. 12, the head 410 is provided with a removable top cover 411. FIG. 14 shows the head 410 with the cover 411 removed. The head 410 is provided with an electric motor 600 forming part of a Y-axis transport 601. The electric motor 600 is preferably a stepper motor and includes a hollow, internally threaded, rotating shaft 602 engaging a helical thread lead screw 604. The lead screw 604 has a fixed end 606 mounted in a lead screw support bracket 608. The Y-axis transport comprises a support plate 612 and the motor 600 is mounted by means of a mounting bracket 610 to support plate 612. A standard circuit board 614 is mounted on the plate 612. Mounted to support plate 612 is an optical unit 615 comprising an upper portion 616 and a lower portion 618 which includes optical extension 510. The optical unit 615 is supported by means of a support strap 620 comprising vertically extending strap sections 622 and 624 and horizontally extending strap sections 626 and 628. The strap 620 is attached to bearings 636, 638 and supported on an horizontally extending bearing shaft 630. The shaft 630 is supported at opposite ends by shaft supports 632 and 634. When the motor 600 is operated, it moves horizontally on the lead screw 604 in the direction of the Y-axis. Correspondingly, the support plate 612, together with the circuit board 614 and the optical unit 615, move horizontally in the direction of the Y-axis as indicated by the arrow 640.

The scanning colorimeter 400 comprises a colorimeter head 410 which is moved in the direction of the X-axis by turning of the lead screw 418 and in the direction of the X-axis by operation of the motor 600 on the lead screw 604. This capability has been found to be particularly advantageous for two reasons. The first reason is that the head is movable in the Y direction to enable the head to properly align with a central part of the color patch to be measured even when the color patches are not properly aligned in the X direction. Further, it allows the optical unit to be moved in the Y direction within the head to obtain color data from two adjacent rows of color patches extending along one side of the paper. The optic unit 615 may be a standard optical unit such as described, for example, in U.S. Pat. No. 5,073,028, which is incorporated by reference herein, or other well-known optical units. The head 410 will include a battery and signal processing circuitry for processing signals from the optical unit in well-known manner such as described, for example, in U.S. Pat. No. 5,073,028. A processor 613 and other electrical connections may, for example, be supported on the circuit board 614, shown in FIG. 14 and appropriately interconnected with the optical unit and optical connector 432. In a preferred embodiment, the optical unit comprises the rotating wheel spectrophotometer described herein with respect to FIGS. 2 through 11.

Figure 15:
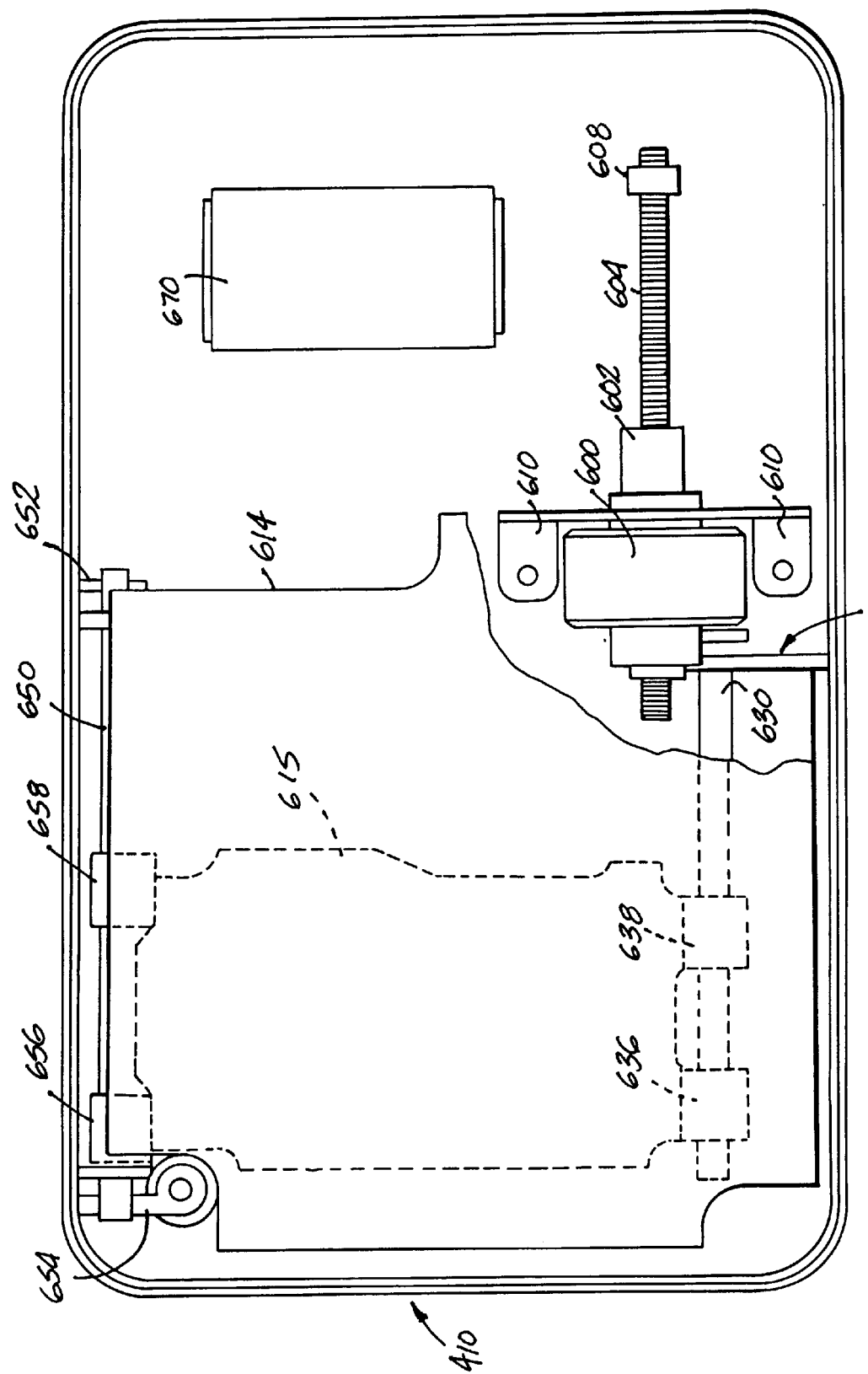
FIG. 15 is a partial breakaway top elevation of the colorimeter head with the top cover removed.

FIG. 15 is a top view of the head 410 and a partial cutaway view of the electric motor 600 and motor support brackets 610. The cover 411 of the head 410 is removed. The optics unit 615 is shown in phantom under the circuit board 614. Further shown in FIG. 15, are the X-axis bearing shaft 630, also shown in FIG. 14, and the Y-axis bearing shaft 650 supported by shaft supports 652 and 654 and bearings 656 and 658. The strap 620 (FIG. 14) attaches to the bearings 656, 658. Operation of the motor 600 causes movement of the circuit board 614 and the supported optic unit 615 in the direction of the Y-axis. A battery 670 is disposed in the head 410 and provides electrical power to motor 600 as well as other electrical circuitry.

Figure 16:
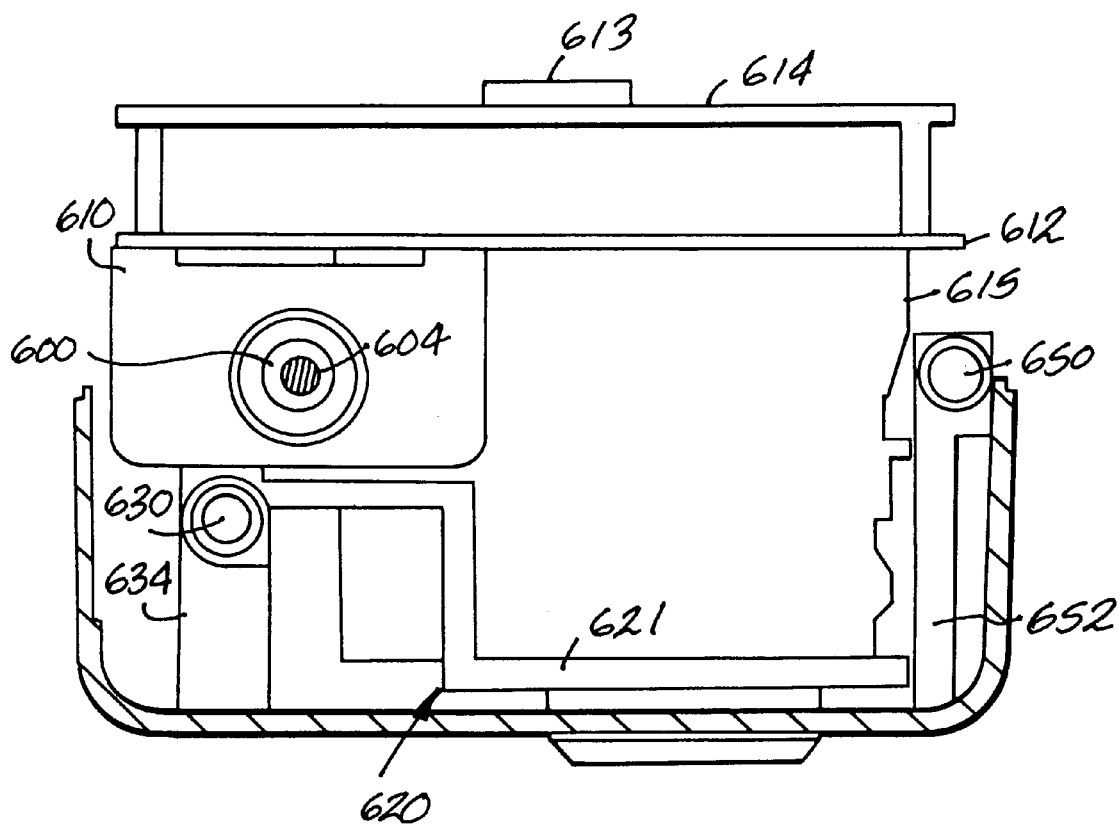
FIG. 16 is a cross sectional view along line 16—16 of FIG. 14.

FIG. 16 is a cross sectional view along line 5—5 of FIG. 14. FIG. 16 shows a motor support bracket 610 as well as the circuit boards 612 and 614 and the optical unit 615. The strap 620 is shown as comprising a horizontally extending section 621. Section 621 is supported via vertically extending straps (not shown in the drawing) mounted on bearings 656, 658, shown in FIG. 15. Strap section 621 extends under a portion of the optical unit 615 between the support shafts 630, 650.

It will be apparent from FIG. 15 that the limits of travel in the direction of the Y-axis are determined by the length of the bearing shafts 630, 650 and the position of the bearings 636, 656 and 638, 658. It will also be apparent from FIGS. 3 and 4 that the motor 600 may move a significant distance toward the support bracket 608, however, no part of the optical unit 615 will move any significant distance beyond the bearing shaft supports 634 and 652.

It will be understood that the above-described arrangement is merely illustrative of the application of the principles of the invention and that other arrangements may be devised by those skilled in the art without departing from the scope of the invention as defined by the appended claims.

What is claimed is:

1. A colorimeter for measuring color of a substantially planar object the colorimeter comprising:
    a longitudinally extending base extending in a first direction;
    a calorimeter head mounted on the base for automated movement in the first direction;
    the base comprising a drive chamber comprising opposing side walls and transport grooves extending longitudinally in the side walls and a first driver engaging the calorimeter head and operative to move the colorimeter head in the first direction;
    the colorimeter head comprising an optical unit mounted for automated movement in a second direction extending substantially perpendicular to the first direction and a second driver mounted on the colorimeter head and operative to move the optical unit in the second direction and a support structure disposed in the drive chamber and engaging the transport grooves and;
    the optical unit moves in a plane substantially parallel to the plane of the object to be measured when moving in both the first direction and the second direction.

2. The calorimeter in accordance with claim 1 wherein the support structure comprises wheels engaging the grooves.

3. The calorimeter in accordance with claim 1 wherein the support structure comprises a platform and the calorimeter head is mounted on the platform.

4. The calorimeter in accordance with claim 3 wherein the colorimeter head is mounted on the platform by at least one mounting screw engaging the calorimeter head adjacent one end of the calorimeter head and the platform comprises at least one adjustment screw spaced from the one end by a predefined distance for positional adjustment of the colorimeter head relative to the platform.

5. The calorimeter in accordance with claim 1 wherein the second driver comprises transport apparatus movably supporting the optical unit and an electric motor driving the transport apparatus in the second direction.

6. The calorimeter in accordance with claim 5 wherein the transport apparatus comprises a pair of support shafts extending in the second direction and a support strap supporting the optical unit and engaging the support shafts.

7. The calorimeter in accordance with claim 6 and wherein the transport apparatus further comprises support bearings slidingly supporting the support strap on the support shafts.

8. The calorimeter in accordance with claim 7 wherein the colorimeter head comprises a housing supporting the support shafts and wherein the electric motor is mounted on the transport apparatus and wherein the second driver further comprises a helically threaded lead screw engaging the motor and having one end fixedly engaging the housing.

9. The colorimeter in accordance with claim 1 wherein the base comprises a material support surface adapted to support the object, and the object comprises a sheet of material to be measured for color and wherein the colorimeter head extends at least partially over the material support surface, the colorimeter further comprising a longitudinally extending stop along one edge of the support surface adjacent the color measuring apparatus, the stop comprising a plurality of retractable sections and measuring apparatus operative to selectively force certain of the retractable stops to a retracted position to facilitate measurement of color along one edge of the material adjacent the stop.

10. The colorimeter in accordance with claim 1 wherein the base comprises a longitudinally extending transport chamber having opposing side walls and the colorimeter head comprises a support structure movably supported in the transport chamber for movement in the first direction;
    the base further comprising a vacuum chamber disposed adjacent the drive chamber and extending in the predetermined direction;
    the vacuum chamber comprising an upper surface and a plurality of openings in the upper surface, the upper surface adapted to support a sheet of material to be measured for color and to maintain the sheet in a selected position when a vacuum is maintained in the chamber;
    the color measuring apparatus extending at least partially over the upper surface.

11. The calorimeter in accordance with claim 10 wherein the base comprising the transport chamber and the vacuum chamber is formed from a single extrusion.

12. The calorimeter in accordance with claim 1 wherein the colorimeter head comprises:
    a rotatable wheel having an axis of rotation and a plurality of light filters, each having a predetermined wavelength characteristics, disposed along a circumferentially extending line on the wheel;
    a light path extending toward one side of the wheel; and
    a light sensor disposed on an other side of the wheel and in alignment with the light path.

13. The colorimeter in accordance with claim 12 wherein the color measuring apparatus comprises a signal processor and the base further comprises a docking end and data receiving connection in the docking end and wherein the signal processor is operative to store data representative of optical readings obtained from the optical unit when the color measuring apparatus is removed from the docking end and operative to transfer data to the data receiving connection when the color measuring apparatus is immediately adjacent the docking end.

14. The colorimeter in accordance with claim 1 wherein the colorimeter head comprises a signal processor and the base further comprises a docking end and data receiving connection in the docking end and wherein the signal processor is operative to store data representative of optical readings obtained from the optical unit when the color measuring apparatus is removed from the docking end and operative to transfer data to the data receiving connection when the color measuring apparatus is immediately adjacent the docking end.

15. The calorimeter in accordance with claim 12 and further comprising an electric motor operably connected to the wheel to rotate the wheel about the axis of rotation at a constant speed through a plurality of revolutions and signal processing circuitry connected to the light sensor and responsive to the electrical signals to derive optical data as the wheel is rotated through the plurality of revolutions.

16. The calorimeter in accordance with claim 1 wherein the first direction and the second direction extend in a substantially horizontal plane.

17. The colorimeter in accordance with claim 10 wherein the opposing side walls comprise transport grooves extending longitudinally in the predetermined direction and the support structure comprises wheels engaging the grooves.

18. A calorimeter for measuring color along one side of a substantially flat sheet, the instrument comprising:
- a longitudinally extending base extending in a first horizontal direction and adapted to be positioned along the one side;
- a colorimeter head mounted on the base;
- the base comprising a calorimeter head driver engaging the colorimeter head and operative to automatically drive the colorimeter head in the first horizontal direction along the one side of the sheet;
- the colorimeter head comprising an optical unit mounted in the calorimeter head and movable in a second horizontal direction extending substantially perpendicular to the first horizontal direction; and
- an optical unit driver operative to selectively and automatically drive the optical unit in the second horizontal direction, whereby the optical unit may be selectively moved in a direction substantially perpendicular to the one side of the sheet to facilitate adjustment of the optical unit relative to a color bar adjacent the one side of the sheet; and
- the optical unit moves in a plane substantially parallel to the plane of the flat sheet when moving in both the first direction and the second direction.

19. A calorimeter for measuring color along an edge of a flat sheet, the calorimeter comprising:
- a longitudinally extending base extending in a first horizontal direction along one edge of the sheet;
- a color measuring head mounted on the base for automated movement in the first horizontal direction;
- the base comprising a driver mechanism engaging the color measuring head and operative to move the color measuring head along the base in the first horizontal direction;
- the color measuring head comprising an optical unit mounted for automated movement in a second horizontal direction extending substantially perpendicular to the first direction and an electrically operated second driver mechanism operative to move the optical unit in the second direction, whereby the optical unit may be selectively moved in the first horizontal direction along one edge of the sheet by control of the driver mechanism of the base and may be selectively moved in a direction perpendicular to the one edge of the sheet by operation of the second driver mechanism, and the second driver mechanism comprises transport apparatus movably supporting the optical unit and an electric motor driving the transport apparatus in the second direction; and
- the optical unit moves in a plane substantially parallel to the plane of the flat sheet when moving in both the first direction and the second direction.

20. A colorimeter for measuring color along one side of a substantially flat sheet, the instrument comprising:
- a longitudinally extending base extending in a first horizontal direction and adapted to be positioned along the one side;
- a colorimeter head mounted on the base;
- the base comprising a colorimeter head driver engaging the colorimeter head and operative to drive the calorimeter head in the first horizontal direction along the one side of the sheet;
- the colorimeter head comprising an optical unit mounted in the calorimeter head and movable in a second horizontal direction extending substantially perpendicular to the first horizontal direction, the optical unit comprising:
  - a wheel having an axis of rotation;
  - an electric motor operably connected to the wheel to rotate the wheel about the axis of rotation at a constant speed through a plurality of revolutions;
  - an aperture;
  - a light path extending from the aperture toward one side of the wheel;
  - a photoelectric primary sensor disposed on another side of the wheel and in alignment with the light path;
  - a plurality of light filters, each having predetermined wavelength characteristics, disposed on the wheel and spaced apart along a circumferentially extending line on the wheel, the circumferentially extending line intersecting the light path;
  - the primary sensor operative to generate electrical output signals representative of light projected through the plurality of filters as the wheel is rotated; and
  - signal processing circuitry connected to the primary sensor and responsive to the electrical signals to derive optical data as the wheel is rotated through the plurality of revolutions;
- an optical unit driver operative to selectively drive the optical unit in the second horizontal direction, whereby the optical unit may be selectively moved in a direction substantially perpendicular to the one side of the sheet to facilitate adjustment of the optical unit relative to a color bar adjacent the one side of the sheet.

* * * * *

UNITED STATES PATENT AND TRADEMARK OFFICE
CERTIFICATE OF CORRECTION

PATENT NO. : 6,031,617                                                           Page 1 of 3
DATED : February 29, 2000
INVENTOR(S) : Berg et al It is certified that error appears in the above-indentified patent and that said Letters Patent is hereby corrected as shown below:

Column 15, Claim 1, Line 41:
    "calorimeter" should be --colorimeter--

Column 15, Claim 1, Line 46:
    "calorimeter" should be --colorimeter--

Column 15, Claim 2, Line 59:
    "calorimeter" should be --colorimeter--

Column 15, Claim 3, Line 61:
    "calorimeter" should be --colorimeter--

Column 15, Claim 3, Line 62:
    "calorimeter" should be --colorimeter--

Column 15, Claim 4, Line 64:
    "calorimeter" should be --colorimeter--

Column 15, Claim 4, Line 66:
    "calorimeter" should be --colorimeter--

Column 15, Claim 4, Line 67:
    "calorimeter" should be --colorimeter--

Column 16, Claim 5, Line 4:
    "calorimeter" should be --colorimeter--

Column 16, Claim 6, Line 8:
    "calorimeter" should be --colorimeter--

UNITED STATES PATENT AND TRADEMARK OFFICE
CERTIFICATE OF CORRECTION

PATENT NO. : 6,031,617
DATED : February 29, 2000
INVENTOR(S) : Berg et al

It is certified that error appears in the above-indentified patent and that said Letters Patent is hereby corrected as shown below:

Column 16, Claim 7, Line 12:
    "calorimeter" should be --colorimeter--

Column 16, Claim 8, Line 16:
    "calorimeter" should be --colorimeter--

Column 16, Claim 12, Line 53:
    "calorimeter" should be --colorimeter--

Column 17, Claim 15, Line 15:
    "calorimeter" should be --colorimeter--

Column 17, Claim 16, Line 22:
    "calorimeter" should be --colorimeter--

Column 17, Claim 16, Line 23:
    after "direction" insert --each--

Column 17, Claim 17, Line 27:
    delete "predetermined" and insert --first--

Column 17, Claim 18, Line 29:
    "calorimeter" should be --colorimeter--

Column 17, Claim 18, Line 36:
    "calorimeter" should be --colorimeter--

Column 17, Claim 18, Line 41:
    "calorimeter" should be --colorimeter--

Column 17, Claim 19, Line 54:
    "calorimeter" should be --colorimeter--

UNITED STATES PATENT AND TRADEMARK OFFICE
CERTIFICATE OF CORRECTION

PATENT NO. : 6,031,617
DATED : February 29, 2000
INVENTOR(S) : Berg et al

It is certified that error appears in the above-indentified patent and that said Letters Patent is hereby corrected as shown below:

Column 17, Claim 19, Line 55:
"calorimeter" should be --colorimeter--

Column 18, Claim 20, Line 26-27:
"calorimeter" should be --colorimeter--

Column 18, Claim 20, Line 31:
"calorimeter" should be --colorimeter--

Signed and Sealed this

Twentieth Day of March, 2001

Attest:

NICHOLAS P. GODICI

Attesting Officer    Acting Director of the United States Patent and Trademark Office